(No Model.) 8 Sheets—Sheet 1.
L. H. NASH.
WATER METER WITH REVOLVING PISTON.
No. 433,088. Patented July 29, 1890.
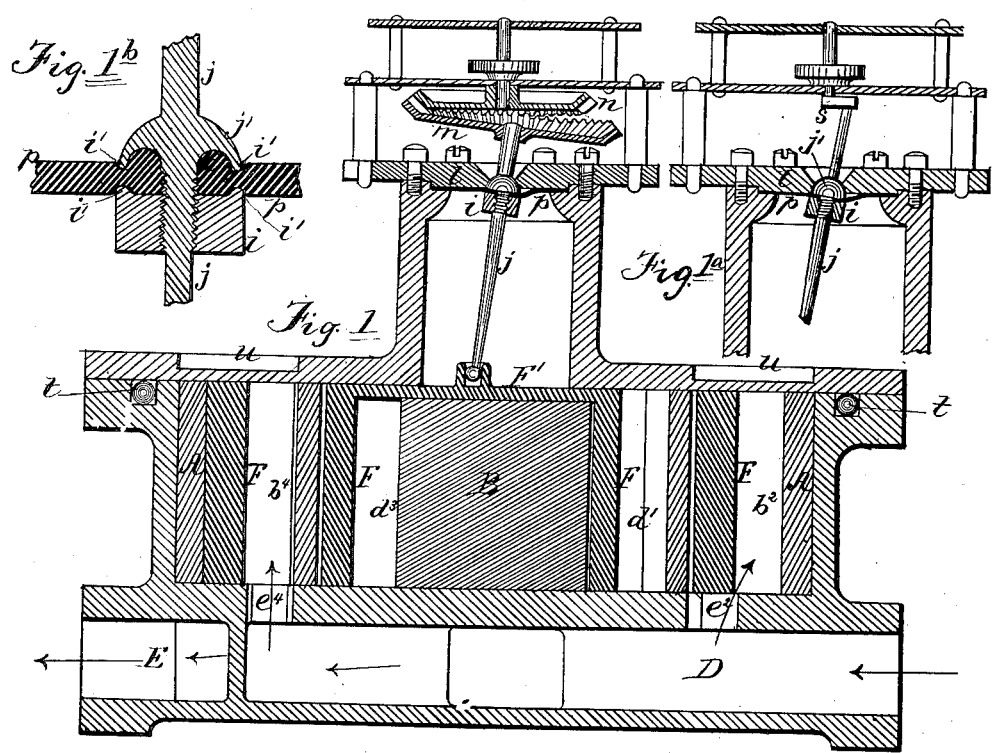
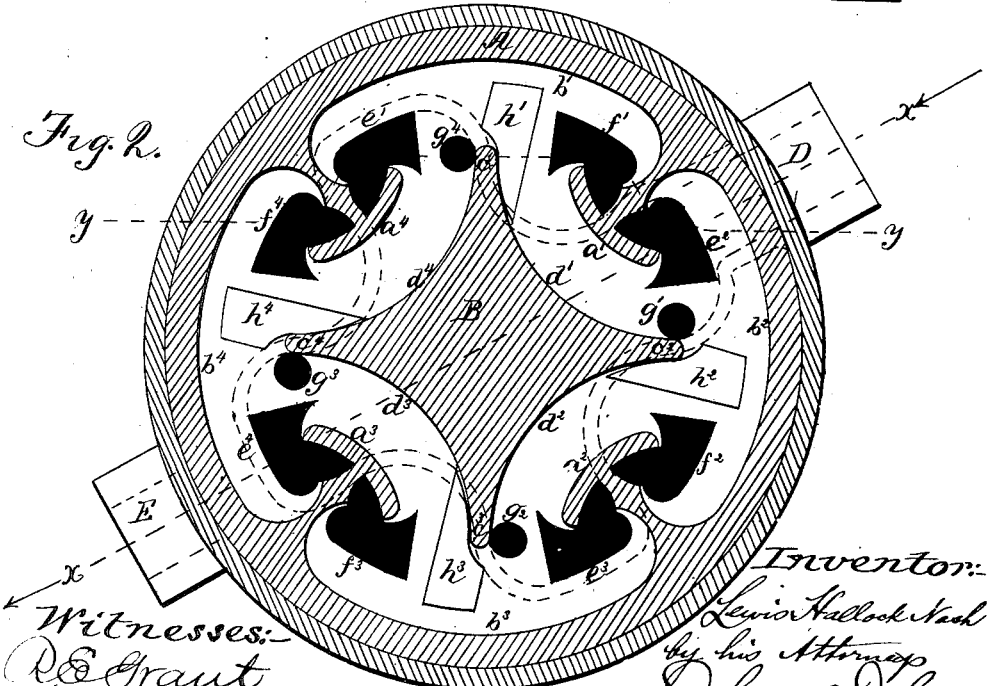
Witnesses:
O. S. Grant
W. R. Williams
Inventor:
Lewis Hallock Nash
by his Attorneys
Johnson and Johnson (No Model.) 8 Sheets—Sheet 2.
L. H. NASH.
WATER METER WITH REVOLVING PISTON.

No. 433,088. Patented July 29, 1890.

Witnesses:
R. S. Grant
W. P. Williams

Inventor:
Lewis Hadlock Nash
by his Attorney
Johnson and Johnson (No Model.) 8 Sheets—Sheet 3.

L. H. NASH.
WATER METER WITH REVOLVING PISTON.

No. 433,088. Patented July 29, 1890.

(No Model.)  8 Sheets—Sheet 4.

L. H. NASH.
WATER METER WITH REVOLVING PISTON.

No. 433,088.  Patented July 29, 1890.

Witnesses:
R. E. Grant
W. R. Williams

Inventor
Lewis Hallock Nash
by his Attys
Johnson & Johnson (No Model.)

8 Sheets—Sheet 5.

L. H. NASH.
WATER METER WITH REVOLVING PISTON.

No. 433,088.  Patented July 29, 1890.

Witnesses:
R. E. Grant
W. R. Williams

Inventor:
Lewis Hallock Nash
by Johnson and Johnson
Attys.

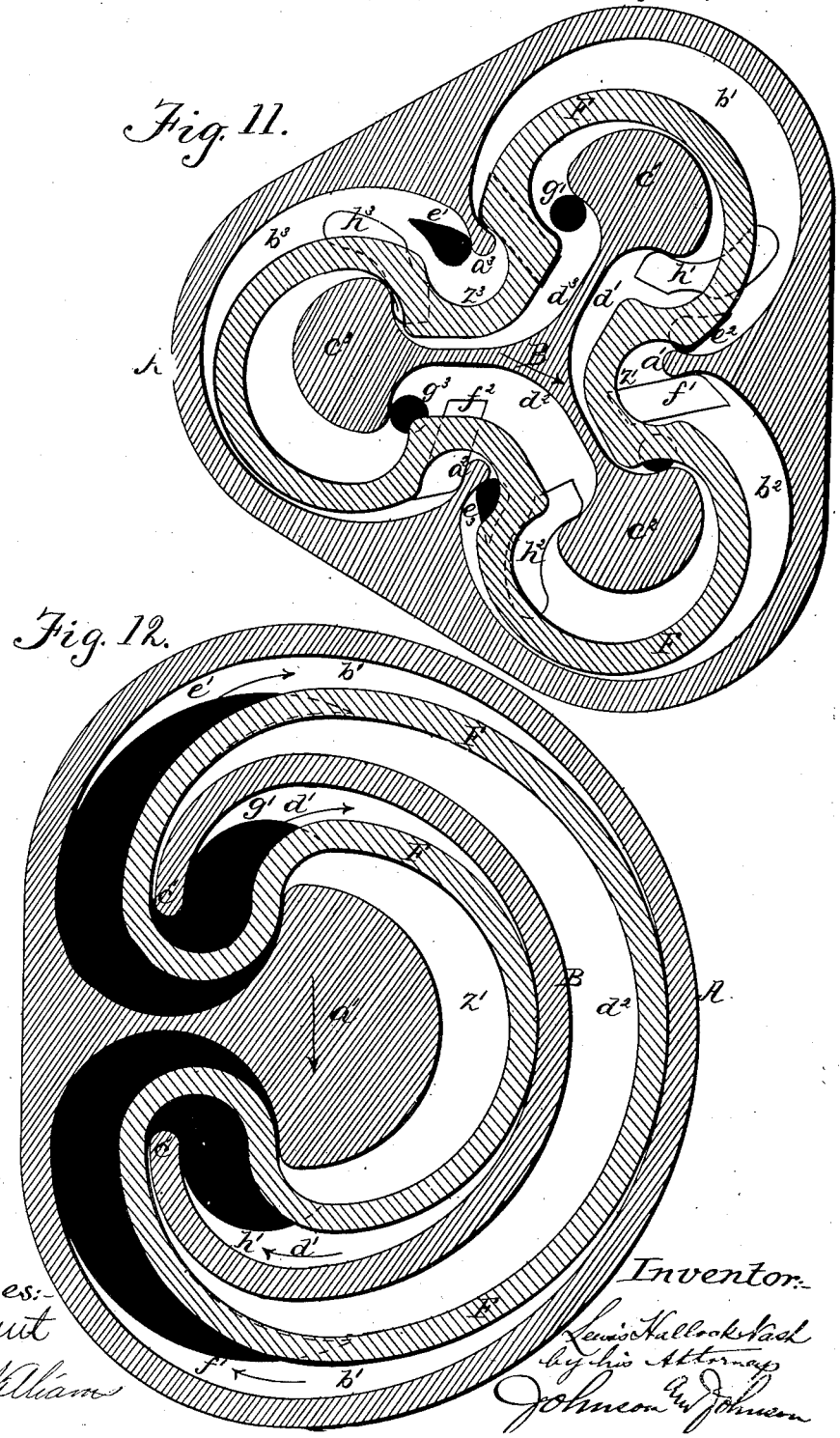

(No Model.)  8 Sheets—Sheet 7.

L. H. NASH.
WATER METER WITH REVOLVING PISTON.

No. 433,088. Patented July 29, 1890.

Witnesses:
R. E. Grant
W. B. Williams

Inventor:
Lewis Hallock Nash
by his Attorneys
Johnson and Johnson (No Model.)

L. H. NASH.
WATER METER WITH REVOLVING PISTON.

No. 433,088. Patented July 29, 1890.

Witnesses:
R. E. Grant
W. R. Williams

Inventor.
Lewis Hallock Nash
by his Attorneys
Johnson & Johnson

UNITED STATES PATENT OFFICE.

LEWIS HALLOCK NASH, OF BROOKLYN, ASSIGNOR TO THE NATIONAL METER COMPANY, OF NEW YORK, N. Y.

WATER-METER WITH REVOLVING PISTON.

SPECIFICATION forming part of Letters Patent No. 433,088, dated July 29, 1890.

Application filed March 10, 1886. Serial No. 194,725. (No model.)

*To all whom it may concern:*

Be it known that I, LEWIS HALLOCK NASH, a citizen of the United States, residing at Brooklyn, in the county of Kings and State of New York, have invented new and useful Improvements in Water-Meters with Revolving Pistons, of which the following is a specification.

My present invention relates to water-meters in which a case contains an interior fixed abutment having alternate projections and recesses or corrugations and a piston provided with alternate projections and recesses or corrugations, which coact with the corrugation on the abutment to form a plurality of enlarging and contracting measuring-spaces.

My invention consists of certain novel parts and combination of parts particularly designated in the claims concluding this specification.

In the accompanying drawings I have illustrated several different forms of meter; but my invention is not limited to the forms there shown, nor is it limited to the total combination of elements illustrated in either of said figures, except as designated in the claims.

Figure 13:
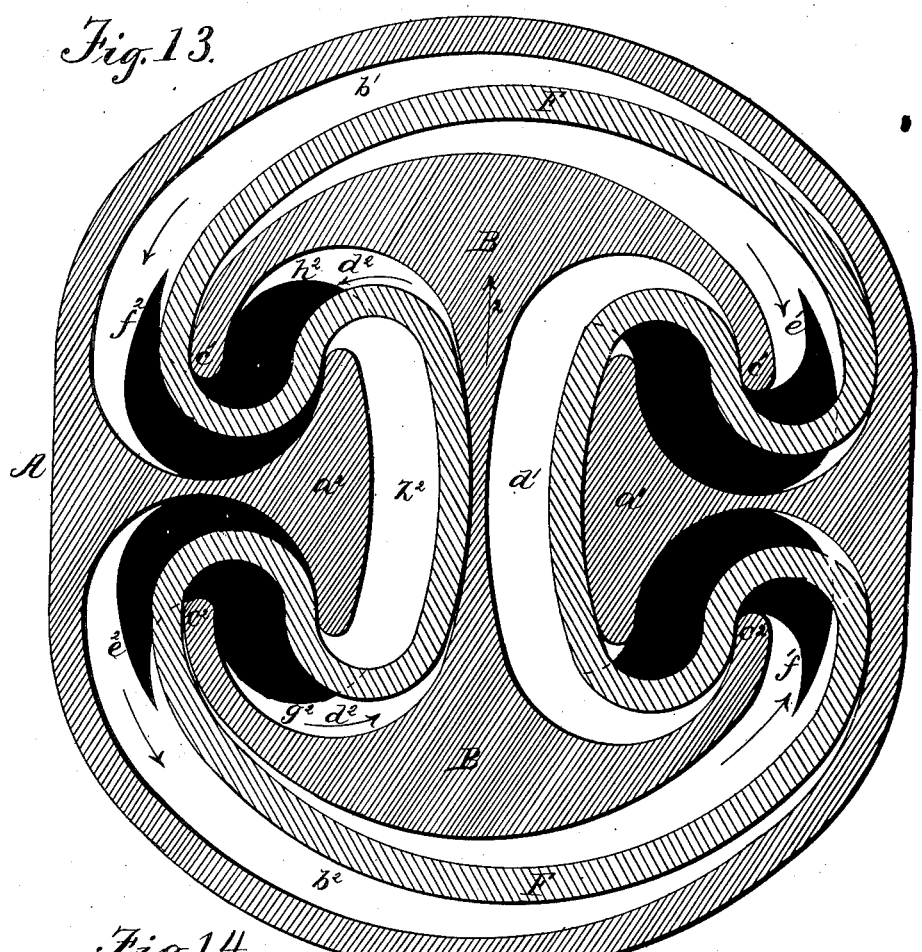
Figure 14:
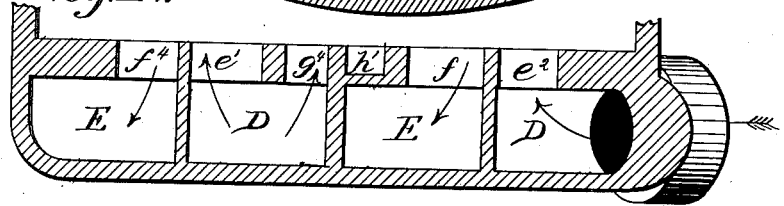
Figure 15:
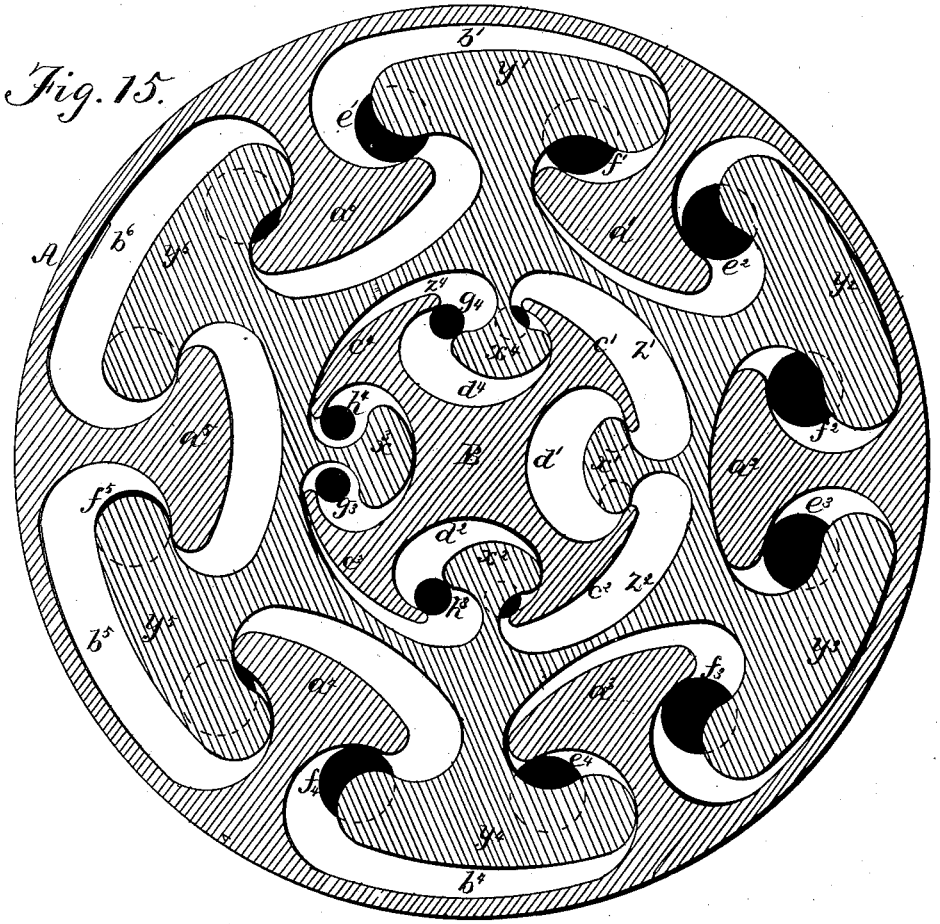
Figure 16:
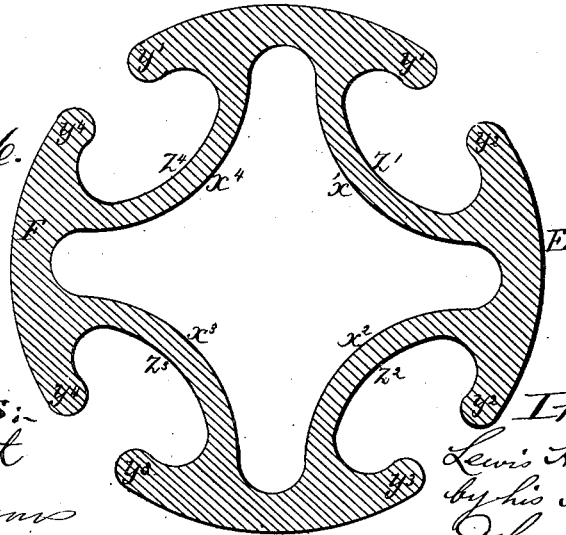

Figure 1 represents in vertical section a water-meter complete, except the dial mechanism, taken on the line $x\ x$ of Fig. 2. Fig. 1$^a$ shows a modification of the register-connecting device. Fig. 1$^b$ shows an enlarged detail sectional view of the diaphragm joint-forming clamp-grip for the register-connecting device. Fig. 2 is a horizontal section of the inclosing-case, showing the inlet and outlet ports and central fixed abutment. Figs. 3, 4, 5, and 6 are horizontal sectional views showing the piston in different relations to the case and the abutment. Figs. 7 to 13, inclusive, show modified forms of piston and case. Fig. 14 is a sectional detail of the lower case-head, taken on the line $y\ y$ of Fig. 2, Sheet 1, showing the connection of the ports with the inlet and discharge passages. Fig. 15 shows a modification in which the bearing projections of the case and abutment are of unequal number and a piston corresponding therewith. Fig. 16 shows the piston taken from Fig. 2, Sheet 1.

The following is a description of the accompanying drawings and the meters illustrated therein.

Referring to Figs. 1 to 6, inclusive, the cylinder A is formed with interior bearing projections $a'$ to $a^4$, inclosing recess-spaces $b'$ to $b^4$. The interior abutment B has projections $c'$ to $c^4$, inclosing and bounding recess-spaces $d'$ to $d^4$. Each case has an inlet-port $e'$ to $e^4$ and an outlet-port $f'$ to $f^4$, and each recess-space of the abutment has an inlet-port $g'$ to $g^4$ and a discharge-port $h'$ to $h^4$. The inlet-ports are supplied from the inlet-passage D, and the discharge-ports $f'$ to $f^4$ open into the discharge-passage E. (Shown in full lines, Fig. 1, and in dotted lines in Fig. 2.) The piston F is in the form of a hollow corrugated cylinder, having the exterior bearing projections $y'$ to $y^4$, which make perpetual joint-forming contact with the case-recesses $b'$ to $b^4$, between which bearing-points are recesses $z'$ to $z^4$, in which the case projections $a'$ to $a^4$ also make perpetual contact. The interior projections $x'$ to $x^4$ of the piston make intermittent contact with the walls of the abutment-recesses $d'$ to $d^4$, while the intermediate abutment-points $c'$, &c., make intermittent contact with the cylinder interior recesses. Thus each case-recess is divided into enlarging and contracting spaces by the piston projections, and the interior spaces, $d'$, &c., of the piston are also similarly divided by the corrugations of the case abutment. In its movement each piston projection enters in succession a corresponding case or abutment-recess, displacing the water therefrom in succession from before it, and each space is refilled from behind as the piston moves out of said recess-space; hence a description of the action of the piston projections in displacing the water from any one recess-chamber will be a description of their action in any other similar recess-chamber. When the piston is formed of a thin cylinder, I prefer to form it with a connecting-web F', Fig. 1, which also serves as a convenient means to connect the registering apparatus; but the latter may be attached to any other convenient part of the piston in case it is not desired to use the strengthening-web.

I prefer to use the register connecting device shown, which consists of a gyrating arm $j$, having a bearing in a plate $l$ of the case, and its inner end loosely connected to the piston and its outer end connecting with and driving the registering mechanism. The inner end of the arm $j$ is caused to move in a circular path, and its outer end will therefore also describe a similar movement, which motion is communicated to the dial mechanism by differential connecting mechanism. I prefer to use for this purpose the differential bevel gearing shown in Fig. 1, which consists of a driving-gear $m$, secured to the arm $j$, which meshes into and drives a gear $n$, secured to the spindle of the dial mechanism. The gears $m$ and $n$ have not the same number of teeth, and the gear $m$ does not rotate, but gyrates over the teeth in the gear $n$, so that for each gyration of the gear $m$ the gear $n$ will be moved a distance equal to the difference in the number of teeth in the two gears.

In Fig. 1ª I have shown a simpler means for driving the dial mechanism, which consists of a crank $s$, driven directly by the movement of the arm $j$; but the special advantage of the differential gear shown in Fig. 1 is that it also forms a speed-reducing gearing for communicating the movement of the piston to the dial mechanism with a reduced velocity.

The joint between the arm $j$ and the case is formed by a diaphragm $p$, preferably of rubber, which embraces the said arm-joint and is clamped by a bearing-plate $l$ to the case, said arm having a spherical bearing $j'$ in said plate. This diaphragm I prefer to make as thin as possible and to clamp it to the gyrating arm by a nut $i$, screwed thereon, as shown in Fig. 1ᵇ, Sheet 1. As the peculiar motion of the arm constantly tends to pull the diaphragm from its clamped point on the arm, to prevent such opening of the joint the clamping-faces of the arm and nut are made concave or grooved, so as to form grip-edges $i'$, and thereby make the clamp a positive hold for the diaphragm, while permitting the latter to have the freest flexibility with the motion of the arm.

$t$ is a flexible packing placed in a groove cut in the upper surface of the flange of the case. When the flanges are not bolted together, the flexible packing extends above the surface of the metal flange, but when the flanges are bolted it is forced down into its groove, allowing the metallic faces of the two flanges to come into close contact. By this means the height of the case-chamber is made certain with the use of a flexible packing-joint.

Another important feature of my invention is a provision by which the meter is prevented from being damaged by freezing. For this purpose I form the upper head of the case so that it shall be very much weaker in thickness at some point, as at $u$ $u$, than the body of the case, it being, however, made amply strong to sustain the ordinary pressure of the water to which it will be subjected in actual use, but not strong enough to sustain the pressure due to the freezing in the case. The body of the case is, however, made very strong, so that when the water freezes in the meter the case will not be injured, but the upper head will yield with the pressure of the ice, and thus prevent all excessive strain upon the case. In order to accomplish this without danger of the case-head changing its form under the water-pressure and from other causes, I prefer to make the head of sufficient thickness and then to form a groove $u$ around that portion of the head which it is desired to have yield to the freezing-pressure. In this way I form a case-head which will keep its shape under all ordinary conditions of pressure, but which will yield readily to excessive pressure before the case is in danger of being destroyed. The same effect can be accomplished by making the upper head of uniform thinness; but for the reasons given I prefer to form it of unequal thickness.

Referring now to Figs. 1 to 6 for a description of the specific form and construction of the co-operating parts therein shown, it will be seen that the interior wall conformation of the case forms radial projections, terminating in enlarged ends of the curved form to make the joint with the piston-recesses, while between and by these radial projections the case-recesses are formed, so that the piston ends will make joint contact with the walls thereof. The case projections thus formed make vertical ports, which open into the lower inlet and outlet head ports on each side of said projections. The fixed abutment has projections, each standing between the case-abutments, but not extending to the case-wall, and forming between them the abutment-recesses. The ports for the abutment-recess spaces are formed on each side at the ends of the abutment projections, the inlet-port $g'$, &c., having free communication with the inlet-passage D, while the outlet-ports $h'$, &c., are channels in the case-head and are of an elongated form, so as to allow the water to flow under the piston in certain positions of its movements to effect the discharge of the water from the abutment-spaces. The piston is placed between these fixed conformations, and its interior conformations coincide with the exterior conformations of the abutment, while its exterior conformations coincide with the case-wall conformations to operate as described.

I have shown the inlet and the outlet ports as placed only in the lower case-head; but they may be also placed in an upper head or duplicated in any other suitable way, which would double the capacity of the ports.

As shown in Figs. 1 and 2, the case-wall projections may be formed by an inserted cylinder, or they may be cast with the inclosing-case.

The operation of the meter is as follows: The piston being in position, Fig. 3, water enters the measuring-spaces through the ports $e'$, &c., $g'$, &c., and escapes from ports $f'$, &c., while the water from space $d'$ escapes through pass-port $h'$ into space $b'$, as shown by arrows, driving the piston in the direction of arrows 2 into position shown in Fig. 4, at which time the space $b'$ has changed from a receiving to a discharging space. The water from space $d'$ still escapes during this time through port $h'$, while the chambers $d^2$ $d^3$ $d^4$ are in free connection with the supply-ports $g^2$, &c. In this way the piston is driven to the position shown in Fig. 5, at which time the chamber $z'$ changes from a receiving to a discharging space. The water now entering and escaping, as shown by the arrows, moves the piston into the position shown in Fig. 6, from which position the piston is driven, as shown by arrow 2, back to the original position shown in Fig. 3. Thus in the piston's movement all the receiving-chambers $b'$ $z'$, &c., outside of the piston and the chambers $d'$, &c., inside the piston are successively filled and emptied.

In the modifications shown in Figs. 7 to 11, inclusive, I have shown a variety of different forms of piston case and abutment, all, however, operating essentially in the same manner. In Fig. 12 the case has only one bearing projection $a'$, and the abutment B is in the center of the horseshoe-shaped case-chamber. In Fig. 13 two bearing projections are used, and Fig. 15 shows a modification wherein the case and abutment do not have the same number of bearing projections. In these several plans the piston is free and has no mechanical connection with the case, since the pressure of the water serves to keep the piston in contact with the case-walls.

The meter may be made of any desired number of coacting bearing projections, and it is not necessary that the piston and case projections should be formed of circular bearing ends symmetrically placed around the center of the case, as shown; but their form may be varied and retain substantially the same mode of operation described.

I have stated that the contact of the piston with the case is perpetual and intermittent with the abutment; but in Figs. 12, 13, and 15 such contact is shown as being perpetual both with the case and with the abutment.

Figure 3:
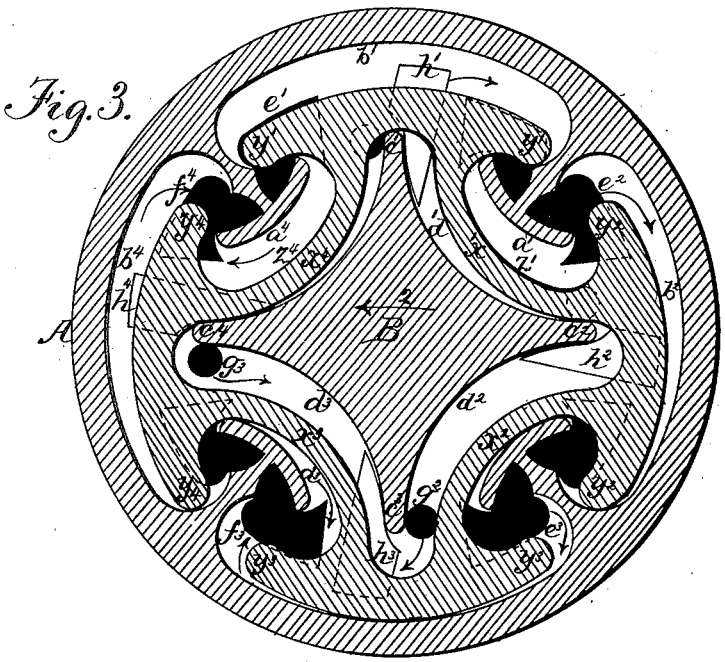
Figure 4:
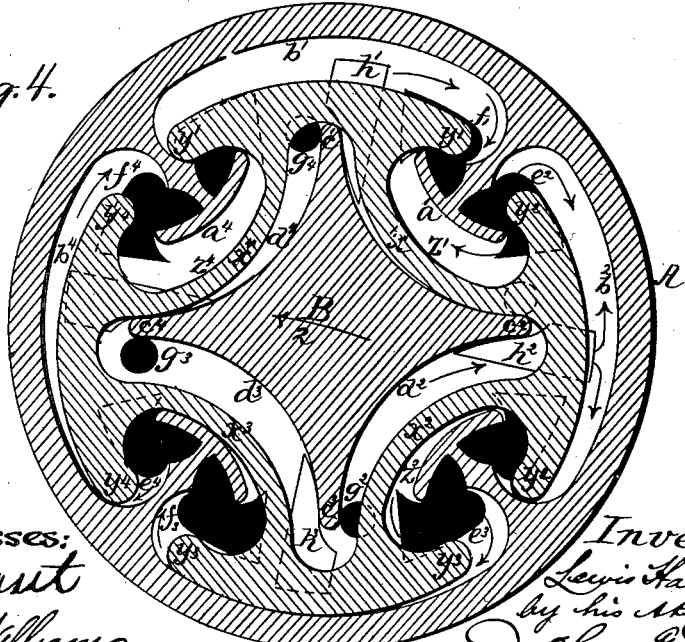
Figure 5:
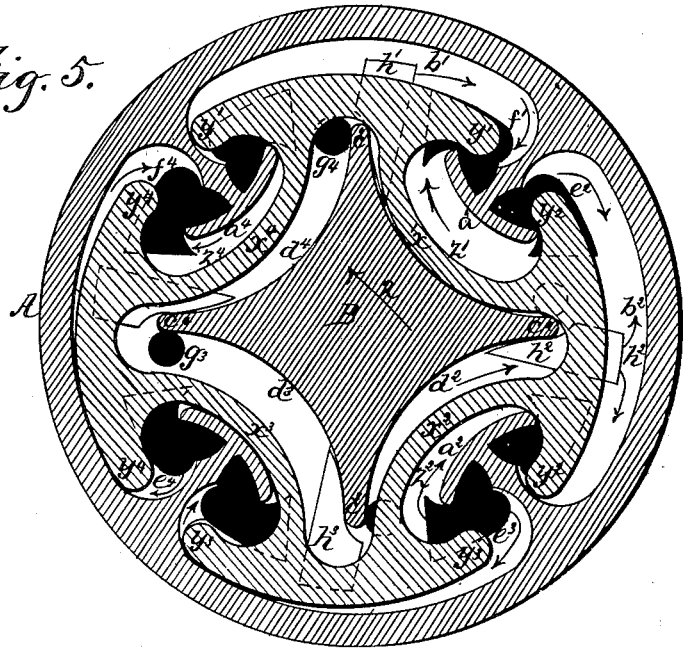
Figure 6:
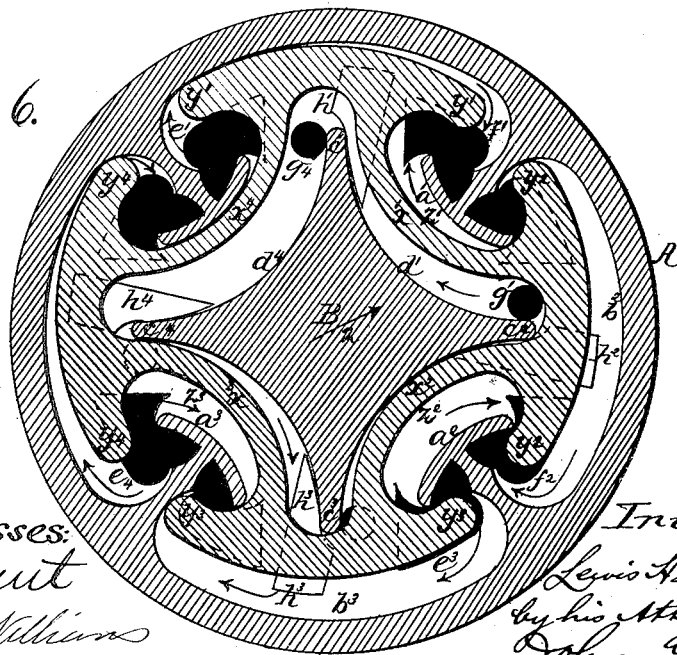
Figure 7:
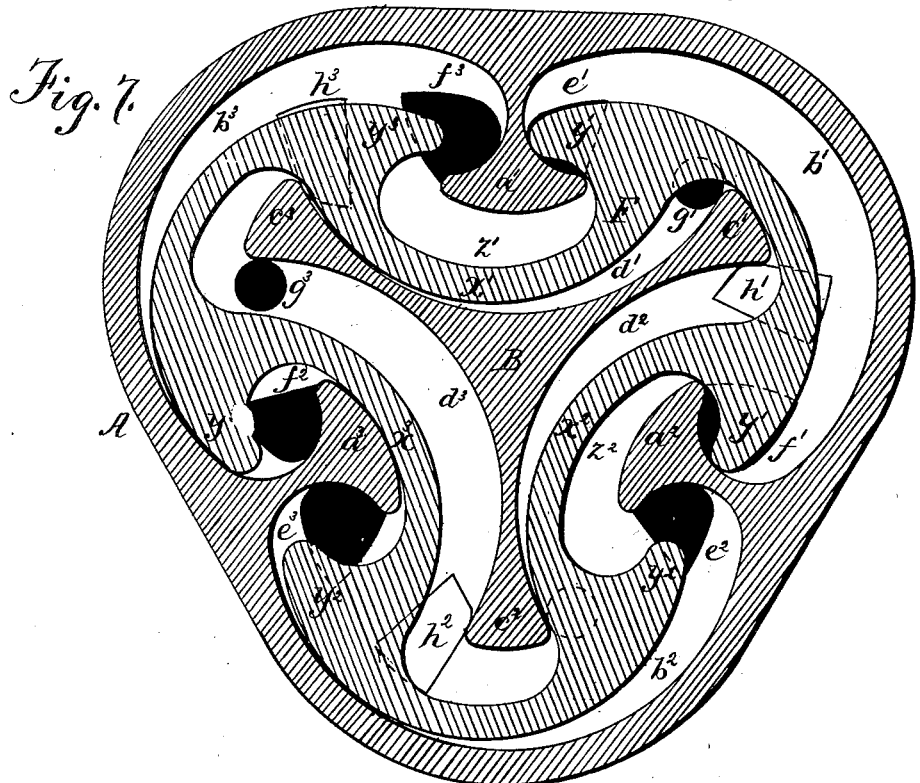
Figure 8:
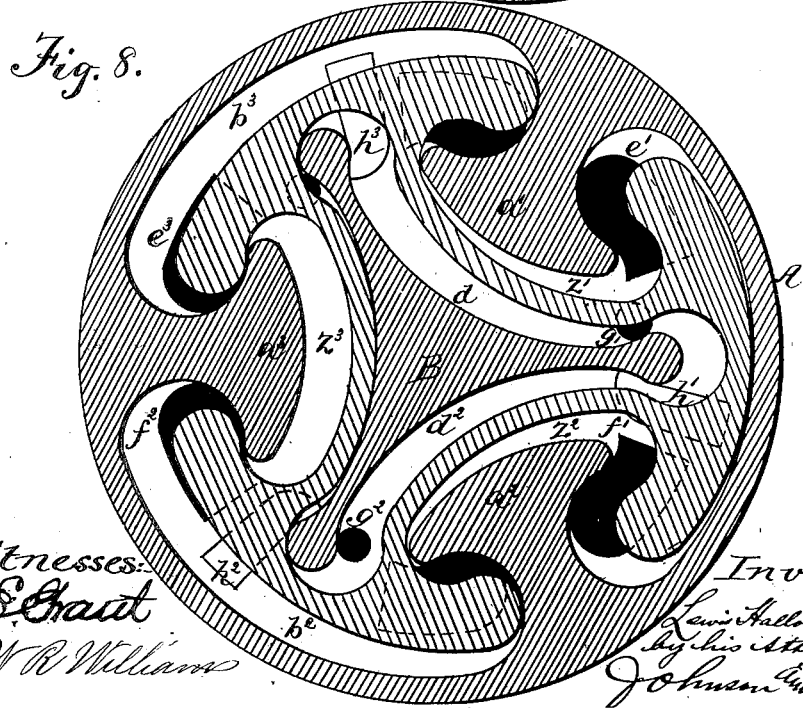
Figure 9:
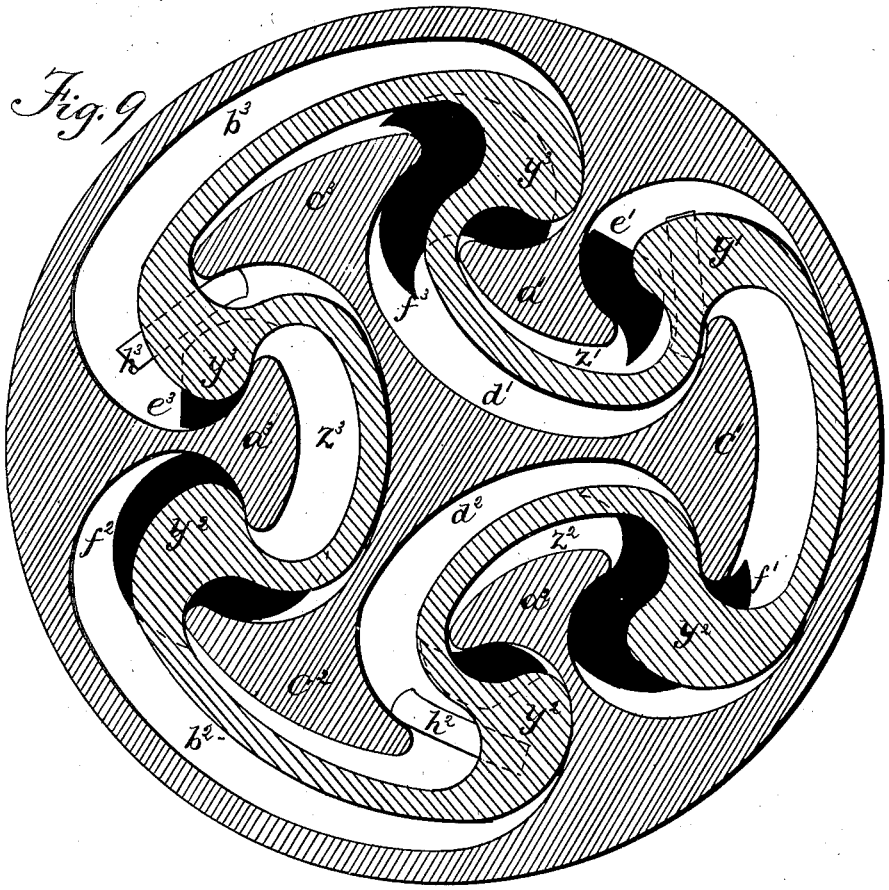
Figure 10:
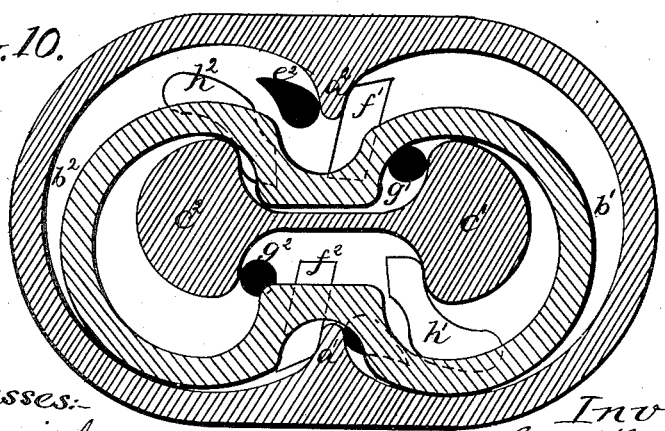

I have stated that the exterior contact of the piston with the case-chamber recess-walls is perpetual, and the specific construction by which this is effected is illustrated in Fig. 3, wherein the piston-points $y'$ $y'$ are so widened at the ends as to make contact with the case-bearing point $a^4$ before it breaks contact with the case-bearing point $a'$. Therefore each piston-point is always in joint, forming contact with some portion of the case-recess walls.

Referring to the intermittent contact of the abutment with the piston in Fig. 3, the abutment-points are not wide enough relatively to the interior conformation of the piston to make contact at the same time with both sides of the piston-recess, and hence during a portion of the movement of the piston the contact is not made on either side of the piston-recess, and therefore such contact will be intermittent in the figure referred to; but in Figs. 12, 13, and 15 the construction is so modified that the contact will be continuous both inside and outside of the piston. My invention, however, is not limited to the specific features above in detail described, since various modifications may be adopted without departing from the spirit of my invention or exceeding the scope of the concluding claims. On the contrary, it is only necessary that there be a meter-chamber having a fixed interior abutment with suitable exterior recesses or projections, and that there be a hollow piston provided with suitable interior projections or recesses, which as the piston moves around within the chamber coact with the projections or recesses of the abutment to form a plurality of enlarging and contracting measuring-chambers, which chambers shall be in communication with some suitable ports, which will permit the water periodically to enter and be discharged from them.

All the pistons illustrated in the drawings revolve around the fixed abutment, but do not rotate about their own axis. Some of the features of my invention are not limited to their application with pistons having this motion, but are applicable to pistons which have other motions—such, for instance, as a motion of rotation about their own axis. Other features of my invention are applicable to meters having pistons of construction and modes of operation substantially different from those described. These points are all indicated by the terms of the claims. Neither is my invention limited to the use of a hollow piston having both exterior and interior projections coacting with projections on the case as well as projections on the abutment, as it is obvious that the projections on the case and the exterior projections on the piston may be omitted. This is true of the construction illustrated in the drawings, or some of them, as the inner and outer sets of ports are separate, and hence the device will, with obvious modifications, operate with a piston having only inwardly-projecting corrugations.

I claim—

1. The combination, with a water-meter, of a corrugated interior fixed abutment, a corrugated inclosing cylinder-wall forming an unobstructed intervening space, a corrugated piston operating in the unobstructed space between these fixed corrugations, and suitable inlet and discharge ports, substantially as described, for the purpose specified.

2. The combination, with a water-meter, of a hollow piston having interior and exterior recess-forming corrugations, a fixed interior corrugated abutment wholly inclosed by said piston, and inlet and outlet ports for each receiving and discharging recess for the case and for the piston.

3. The combination, in a water-meter, of the case forming the measuring-chamber, an interior fixed abutment, and a piston having a free movement between them in every direction within measuring-spaces of the case and of the abutment, substantially as described, for the purpose specified.

4. The combination, in a water-meter, of the case forming the measuring-chamber, having wall-corrugations, an interior fixed abutment having wall-corrugations, and a piston having exterior and interior wall-corrugations, and a free movement in every direction between said parts to make intermittent contact with the abutment projection and perpetual contact with the case projections.

5. The combination, in a water-meter, of a corrugated piston having a free revolving non-rotating motion with a corrugated inclosing-case and a corrugated interior fixed abutment, the corrugations of the piston being brought successively into contact with the case-recesses and with the abutment-recesses moved therein, and the contact maintained without and within the piston during the inflow and discharge of the water into and from each corrugation.

6. The combination, in a water-meter, of a case having wall-corrugations, a fixed interior abutment having wall-corrugations, and inlet and discharge ports for each corrugation, and a corrugated piston having a free revolving non-rotating motion to operate the said ports.

7. The combination, in a water-meter, of a case having wall-corrugations, a fixed interior abutment having wall-corrugations, and a piston having exterior and interior corrugations forming co-operating bearing projections inclosing and bounding measuring-spaces, and inlet and outlet ports located on each side of the bearing projections of the abutment and of the case controlled by said piston.

8. The combination, in a water-meter, of a chamber-forming case having one or more radial bearing-points, an interior fixed abutment, and a hollow piston having a free revolving non-rotating movement dividing the chamber into measuring-spaces, with inlet and outlet ports opening into the measuring-spaces both inside and outside of the piston and controlled by its movements.

9. The combination, in a water-meter, of a corrugated cylinder-wall, a corrugated interior fixed abutment, and a corrugated piston having a free revolving non-rotating movement dividing the chamber into measuring-spaces, with inlet-ports $e'$, &c., and outlet-ports $f'$, &c., opening into said spaces exterior to said piston, the outlet-ports $g'$, &c., opening interior to the piston, and the recess-ports $h'$, &c., making communication from one side to the other of the piston.

10. A water-meter case having interior wall projections forming measuring-spaces, an interior fixed abutment having exterior wall projections forming measuring-spaces, and ports communicating with the said measuring-spaces, in combination with a hollow piston having exterior and interior projections operating with a revolving non-rotating movement between the said case-ports to control the flow into and from ports for each said space.

11. The combination, with a water-meter, of a register-connecting device consisting of a gyrating arm, and a differential gear consisting of the bevel-gears $m$ and $n$, having an unequal number of teeth, connecting the said arm with the register mechanism.

12. The combination, in a water-meter, of a register-connecting device consisting of a gyrating arm connecting the meter-moving parts and the register mechanism with a joint-forming diaphragm, and a clamping-nut having grip-edges $i'$ for the diaphragm, substantially as described, for the purpose specified.

13. In a register-connecting device for a water-meter, the combination, with a gyrating arm and a joint-forming diaphragm, of a joint-forming clamp consisting of a clamping-nut having a concave or grooved face, and a corresponding concave or grooved shoulder on the connecting device forming grip-edges for holding the diaphragm.

14. The combination, with a water-meter having its chamber-forming case made relatively strong, of an inclosing-head therefor made relatively weak, whereby to form a yielding part against undue interior pressure.

15. The cover or inclosing-head of a water-meter case having a groove or surface-recess to reduce the thickness of the inclosing-head over the measuring-chamber, substantially as described, and for the purpose stated.

16. The combination, in a water-meter, of a case having wall-bearing projections terminating in wide points, and an interior fixed abutment leaving narrow bearing-points with a hollow piston having wide external bearing-points and an interior conformation, as described, and for the purpose specified.

17. The combination, in a water-meter of a corrugated cylinder-wall, a corrugated interior abutment, and a corrugated piston having a free revolving non-rotating movement dividing the chamber into measuring-spaces with inlet-ports $c'$, &c., and outlet-ports, $f''$, &c., opening into said spaces exterior to said piston, the outlet-ports $g'$, &c., opening exterior to the piston, the channel-ports $h'$, &c., and the communicating inlet and outlet passages D and E, substantially as described, for the purpose specified.

18. The combination, in a water-meter, of a case provided with a fixed interior abutment having exterior recesses and arms or projections, and suitable inlet and outlet ports, with a hollow revolving non-rotating piston, having inwardly-projecting arms which enter and sweep through said recesses to control said ports.

19. The meter-case having a fixed interior abutment having two or more wall-recesses and inlet or outlet ports within said recesses, in combination with a hollow revolving non-rotating piston having arms or projections which enter and sweep within said recesses to control said ports, as set forth.

20. In a water-meter, the hollow revolving non-rotating piston having interior wall-arms or projections and interior wall-recesses formed by said arms, in combination with a case having inlet and outlet ports, and a fixed interior abutment B, having an exterior wall conformation corresponding with the interior conformation of the piston, substantially as described.

21. The combination, with the fixed abutment having measuring-chambers provided with inlet and outlet ports, of the circular hollow piston surrounding the abutment and arranged to move freely between the fixed heads of said measuring-chambers, and having inwardly-projecting arms adapted to enter and sweep through said abutment-chambers, substantially as described.

22. The combination, with the circular hollow piston arranged to move freely between the fixed heads of the measuring-chambers and having a plurality of inwardly-projecting arms, of the stationary abutment having a corresponding number of measuring-chambers through which said piston-arms sweep, and provided with inlet and outlet ports which are controlled by the movements of said piston, substantially as described.

23. The combination, with the circular hollow piston arranged to operate freely between the fixed heads of the measuring-chambers and having a plurality of inwardly-projecting arms, of the stationary abutment having a corresponding number of measuring-chambers through which said piston-arms have sweeping movements, and provided with inlet and outlet ports which are controlled by the movements of the piston, the said piston-arms being held in contact with the walls of said chambers and caused to sweep through them by the pressure of the water upon the inner surface of the piston, substantially as described.

24. The combination, in a water-meter, of a case provided with a fixed abutment having a plurality of measuring-chambers having inlet and outlet ports, with a shell surrounding the abutment arranged to operate freely between fixed heads of the measuring-chambers and having a number of inwardly-projecting arms corresponding to the measuring-chambers, which are caused to enter and sweep through said chambers by the pressure of the water upon the inner surface of said shell, and means, substantially such as described, whereby the movements of said piston are communicated to the registering mechanism.

25. The combination, with the circular hollow piston arranged to operate freely between the fixed heads of the measuring-chambers and having a plurality of inwardly-projecting arms, of the fixed abutment having a corresponding number of measuring-chambers through which said piston-arms sweep, each chamber being provided with an inlet and an outlet port, which are formed in the bottom chamber-head and are controlled by the movement of said piston, substantially as herein set forth.

26. The combination of a water-meter case having a fixed central abutment formed with outwardly-projecting bearing-arms and intermediate recess-spaces, with an annular or hollow piston having inward wall projections or arms coacting with the abutment-arms to divide the recesses into enlarging or contracting measuring-spaces, an upper head making joint contact with the upper end of the fixed abutment, and suitable inlet and discharge ports for the measuring-spaces, substantially as described.

27. The combination, with the fixed abutment having measuring-chambers provided with inlet and outlet ports, of the circular hollow piston surrounding the abutment arranged to move freely between fixed heads of said measuring-chambers, and having inwardly-projecting arms adapted to enter and sweep through said abutment-chambers, an inclosing-case forming a chamber above said piston, and register-connecting mechanism arranged within said chamber connected with said moving piston, substantially as herein set forth.

28. The combination, in a water-meter, of a case provided with a fixed interior abutment having exterior recesses and arms or projections, and suitable inlet and outlet ports, with a hollow revolving non-rotating piston having inwardly-protecting arms, which enter and sweep through said recesses to control said ports, and fixed end plates, between which said piston freely moves.

29. The combination, in a water-meter, with a circular hollow piston arranged to move freely between fixed heads of the measuring-chambers, and having a plurality of inwardly-projecting arms, of a fixed abutment-block having a corresponding number of measuring-chambers, through which said piston-arms sweep, each chamber being provided with an inlet and outlet port which are formed in a chamber-head.

30. The combination, in a water-meter, of a case provided with a fixed interior abutment having exterior recesses and arms or projections, and suitable inlet and outlet ports, with a hollow revolving non-rotating piston having inwardly-projecting arms which enter and sweep through said recesses.

31. The combination, in a water-meter, of a case provided with a fixed central abutment having exterior recesses and arms or projections, and suitable inlet and outlet ports, with a hollow piston having inwardly-projecting arms which enter and sweep through said recesses to control said ports.

32. The combination, in a water-meter, of a case provided with a fixed central abutment having exterior recesses and arms or projections, and suitable inlet and outlet ports, with a hollow piston having inwardly-projecting arms which enter and sweep through said recesses to control said ports, and fixed end plates, between which said piston moves.

33. The combination, in a water-meter, of a fixed central abutment having measuring-spaces and suitable inlet and outlet ports, the circular hollow piston surrounding said abutment and having inwardly-projecting arms, the inclosing-case, and a registering mechanism and suitable connections between the register and the moving piston.

In testimony whereof I have hereunto set my hand in the presence of two subscribing witnesses.

LEWIS HALLOCK NASH.

Witnesses:
 A. E. H. JOHNSON,
 J. W. HAMILTON JOHNSON.